Nov. 21, 1933.   B. F. CONNER   1,935,943
INSERT FOR VACUUM TUBE BASES
Original Filed May 1, 1926

Inventor
Benjamin F. Conner
By S. Jay Teller
Attorney

Patented Nov. 21, 1933

1,935,943

UNITED STATES PATENT OFFICE 1,935,943

INSERT FOR VACUUM TUBE BASES

Benjamin F. Conner, Wethersfield, Conn., assignor to Colt's Patent Fire Arms Manufacturing Company, Hartford, Conn., a corporation of Connecticut Original application May 1, 1926, Serial No. 106,097. Divided and this application November 9, 1926. Serial No. 147,205

6 Claims. (Cl. 173—361)

The invention relates to a metallic insert for a vacuum tube base of the type wherein the body is formed of a molded material, such as a phenolic condensation compound or other artificial resin, and wherein the said body is molded around the upper end portions of the inserts.

The principal object of the invention is to provide an insert of the type described, having improved means adapted to prevent the moldable material from entering the central hole thereof during the process of molding.

Another object of the invention is to provide an insert of the type described, having improved means adapted to serve for firmly holding the insert in place in the molded body of the base.

In the accompanying drawing forming a part of this specification, I have shown the embodiment of the invention which I now deem preferable, but it will be understood that the drawing is for illustrative purposes only and is not to be construed as defining or limiting the scope of the invention, the claims forming a part of this specification being relied upon for that purpose.

Figure 1:
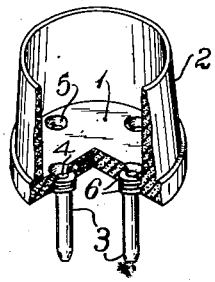
Figure 1 is a perspective view of a vacuum tube base having incorporated therein an insert initially embodying the invention, a portion of the base being broken away to show the construction and mounting of the inserts and also to show the formation of the recesses communicating with the holes in the inserts.
Figure 2:
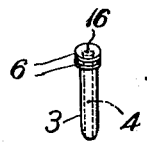
Fig. 2 is a perspective view of one of the inserts prior to its incorporation in a base.

It will be understood that the exact design and proportions of the vacuum tube base may be varied according to requirements, but that in general the base is cup-like in shape having a flat or substantially flat bottom wall 1 and having a cylindrical or substantially cylindrical annular shell 2 projecting upward from the bottom wall. Projecting downward from the bottom wall are inserts corresponding in number and position to the particular design of vacuum tube for which the base is intended. The inserts 3 have longitudinal holes 4 extending entirely through them and adapted for the reception of wires which connect with the tube proper.

The material forming the body of the base is molded into shape and the bottom wall 1 thereof is molded around the upper inner end portions of the inserts 3 so as to firmly hold them in place. Preferably, the material is molded not only around the said inserts but also over the ends thereof so that the said ends are below the top surface of the bottom wall 1. When the ends of the inserts are thus located below the top surface of the bottom wall, the said bottom wall is provided with recesses 5 extending downward from the top surface thereof and communicating with the holes in the respective inserts. Preferably and as shown, each of the said recesses 5 is conical in shape, thus greatly facilitating the assembly of the base with the tube proper. The conical recesses permit the ends of the wires on the tube proper to be more readily directed into the holes in the inserts during assembly.

Preferably in order that the inserts may be more firmly embedded and interlocked in the molded material, each of them is formed at its inner end portion with means such as an enlarged head adapted to be embedded in the moldable material forming the body of the base. The inner end face of the enlarged head is continuous and imperforate throughout, and the said head has at least one shoulder facing longitudinally outward away from the said inner end face. For this purpose I prefer and have shown a plurality of external spaced annular ribs 6. Two such ribs are shown but I do not limit myself to this exact number. During the molding operation the moldable material flows in between the ribs thus firmly holding the insert in place.

It is essential that the holes 4 in the inserts 3 be clean and free from any of the molded material. To this end each of the inserts is provided with a wall 16 initially closing the inner end thereof, the said wall being so thin as to be adapted to be pierced to complete the said hole after the insert is in place in the moldable material. The term "pierce" is to be understood as meaning the making of a hole by the thrusting action of a prick point or punch, as contrasted with the making of a hole by the cutting action of a rotary tool.

The wall 16 of the end of the insert may be, and preferably is, formed as an integral portion of the insert. The said wall 16 is shown as being considerably thinner than the side walls of the insert surrounding the hole 11; but it will be understood that, while this relationship of wall dimensions is sometimes advantageous, the invention is not necessarily so limited. The wall 16 serves during molding to prevent any of the moldable material from entering the hole in the insert, and it is thereafter pierced to complete the said hole 4 as will presently be described.

Figure 3:
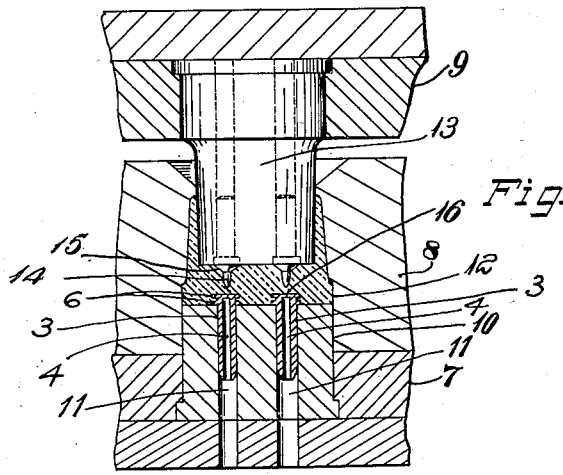
Fig. 3 is a fragmentary sectional view showing inserts embodying the invention in place in a mold.

In order that the purposes and advantages of the novel insert may be fully understood, I shall now describe a mold and a method of molding for use with which the insert is particularly adapted. As shown in Fig. 3 there is provided a mold comprising three sections 7, 8 and 9, which for the sake of convenience will be designated respectively as the bottom section, the intermediate section and the top section.

Projecting upward from the main upper surface of the bottom section 7 is a cylindrical boss 10 provided with vertical holes 11 properly spaced and of the proper size to receive the inserts 3 which are to be molded in place in the base. The intermediate section 8 of the mold has an aperture 12 therein of the proper size and properly spaced to receive the boss 10 when the section 8 is placed upon the section 7. The aperture 12 in the section 8 is adapted not only to receive the boss 10, but is also formed to constitute the exterior wall of the mold for determining the exterior shape of the base to be molded. The top section 9 of the mold comprises a core member 13 adapted to enter the aperture 12 in the intermediate section 8 and of the proper size to determine the interior size and shape of the base to be molded.

The core member 13 is provided with a plurality of projections 14 corresponding in number and in spacing to the holes 11 for the inserts 3 located in the boss 10. Each of the projections 14 preferably has a sharp point which is of the same or approximately the same diameter as the hole in the corresponding insert. Preferably each of the projections is also formed with a conical portion 15 extending downward from the main body portion of the core member 13.

In molding the base, the inserts 3 are first put in place in the holes 11 in the boss 10, as shown in Fig. 3, the other sections of the mold being separated from the section 7. The lower annular rib 6 of each insert serves to support the insert, and it will be clear that the lower face or shoulder of the rib will be flush with the bottom surface of the finished base.

As already stated, each of the inserts 3 is initially formed with the longitudinal hole 4 therein terminating below the top thereof so as to leave a thin wall 16 at the top which entirely closes the hole. The next step is to place the intermediate section 8 in assembled relation with the bottom section 7. The required quantity of the phenolic condensation compound or other moldable artificial resin is then placed in the aperture 12. After the intermediate and bottom sections have been assembled as shown, and after the moldable material has been put in place, the top section 9 is brought into operative relation with the other sections.

Figure 4:
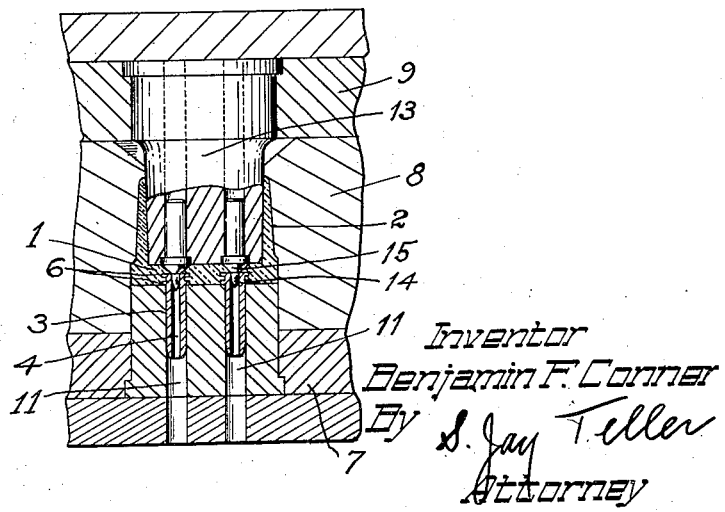
Fig. 4 is a view similar to Fig. 3, but showing the mold parts in different relative positions.

When the sections have been assembled as described, the top section 9 is slowly forced into its final position as shown in Fig. 4. It will be understood that the mold is heated while the top section is being forced into place, this heating being in accordance with the customary practice in molding phenolic condensation compounds and similar materials. As the top section 9 moves downward, the projections 14 move downward through the moldable material and the portions 15 thereof serve respectively to form the before-described conical recesses 5 in the bottom wall 1 of the base. The prick points at the lower ends of the projections 14 serve to pierce and break the thin walls 16 closing the ends of the respective inserts and the said prick points thus serve to open the holes 4 in the inserts. The prick points are so located with respect to the other parts of the mold that the holes are opened just as the mold parts reach their final closed position. Thus the thin integral walls at the upper ends of the inserts prevent any of the material from entering the holes during the early stages of the molding operation. When the molding operation is nearly completed the prick points pierce these thin walls, but the prick points at the same time serve to keep the holes closed and to positively prevent any material from entering them. Thus the inserts are molded in place and the holes therein are kept entirely free from the molded material.

This application constitutes a division of my copending application for Method of molding, Serial No. 106,097, filed May 1st, 1926. The herein-described method of molding is disclosed and claimed in the said application.

What I claim is:

1. A terminal contact insert for a molded vacuum tube base having a central hole extending from the outer end thereof and having a wall initially closing the inner end thereof, the said wall being so thin as to be adapted to be pierced to complete the said hole after the insert is in place in the moldable material forming the body portion of the base.

2. A terminal contact insert for a molded vacuum tube base having a central hole extending from the outer end thereof and having a thin integral wall initially closing the inner end thereof, the said wall being adapted to be pierced to complete the said hole after the insert is in place in the moldable material forming the body portion of the base.

3. A terminal contact insert for a molded vacuum tube base having a central hole extending from the outer end thereof and having a thin integral wall initially closing the inner end thereof, the said wall being thinner than the side walls of the insert surrounding the central hole therein and being so thin as to be adapted to be pierced to complete the said hole after the insert is in place in the moldable material forming the body portion of the base.

4. A terminal contact insert for a molded vacuum tube base provided with external means at the inner end portion thereof adapted to be embedded in the moldable material forming the body of the base and having at least one shoulder facing longitudinally outward, the said insert also having a central hole extending from the outer end thereof and a thin wall initially closing the inner end thereof, the said wall being adapted to be pierced to complete the said hole after the insert is in place in the said moldable material.

5. A terminal contact insert for a molded vacuum tube base having a head at the inner end thereof of greater diameter than the main body of the pin, the said insert also having a central hole extending from the outer end thereof and completely closed at the inner end by a thin wall forming a part of the said head which wall is so thin as to be adapted to be pierced to complete the said hole after the insert is in place in the moldable material forming the body portion of the base.

6. A terminal contact insert for a molded vacuum tube base having a plurality of external spaced annular ribs at the inner end portion thereof adapted to be embedded in the moldable material forming the body portion of the base, the said insert also having a central hole extending from the outer end thereof and a thin integral wall initially closing the inner end thereof, the said wall being adapted to be pierced to complete the said hole after the insert is in place in the said moldable material.

BENJAMIN F. CONNER.